March 16, 1948.  E. E. LEACH, JR  2,437,855
VENEERING ELASTOMERS
Filed Oct. 20, 1942
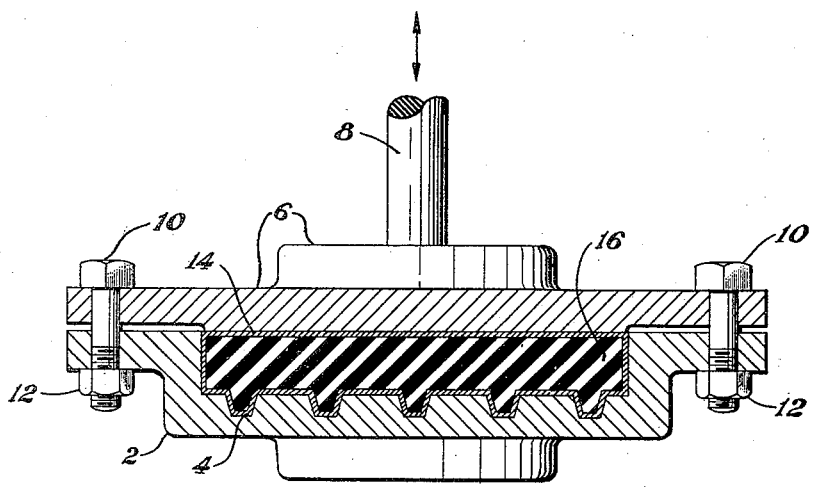
Elden E. Leach Jr INVENTOR.
BY
Edwin C. Woodhouse
ATTORNEY Patented Mar. 16, 1948

2,437,855

UNITED STATES PATENT OFFICE 2,437,855

VENEERING ELASTOMERS

Elden Earl Leach, Jr., Norristown, Pa., assignor to E. I. du Pont de Nemours & Company, Wilmington, Del., a corporation of Delaware Application October 20, 1942, Serial No. 462,755

12 Claims. (Cl. 18—59)

This invention relates to a process for veneering elastomers and particularly for veneering elastomers with different elastomers having different properties and to the resulting products.

It is well known to veneer an elastomer with a different elastomer having different properties so as to obtain an article with the body portion formed of an elastomer having certain desirable properties and a surface having different desired properties. The most common method of carrying out such operation in commercial practice has been to pass the veneering elastomer between rolls to give it a desired thickness which must be above 0.03 inch, then placing it upon the base stock, molding the composite product and then vulcanizing the two together. This procedure has not proved to be satisfactory for several reasons. The veneering elastomers must have a thickness above 0.03 inch in order that they can be handled. Due to the cost of the veneering elastomer, this is uneconomical and has greatly restricted the practical use of such procedure. This procedure is difficult to carry out and requires considerable time and labor which is also objectionable because of the cost and the time element. Further, when such composite materials are molded, particularly in odd shaped and intricate molds, the base material is extended thinning out the veneer in the extended portions so that the veneer is not of uniform thickness throughout the final product and, in some cases, the extension may be so great that the base portion will break through the veneer and become exposed in the more extended portions. Still further, when the elastomer is caused to flow in a mold, it often binds and adheres to the surface of the mold creating a rough surface in the finished article.

Another method of applying a veneer to a base stock has been to make a solution or a dispersion of the veneering elastomer, apply the solution or dispersion to the base stock by painting, spraying or the like, allowing the solvent or dispersing medium to evaporate, then molding and vulcanizing the resulting composite article. This procedure also has the disadvantage of causing the veneer to thin out during the molding so that the final product does not have a uniform thickness of veneer. Also, this procedure tends to produce articles with rough surfaces due to binding and adherence of the elastomer to the mold during the molding step. Further, in this procedure, the solvents and dispersing media evaporate very slowly and the composite material is sticky and difficult to handle.

It is an object of this invention to provide a new and improved method for veneering an elastomer composition with a different elastomer composition having different properties. Another object is to provide such a method wherein the veneer is of uniform thickness and wherein veneers may be obtained which will be thinner than can be obtained by the laminating process. A further object is to provide such a method which can be carried out more readily in a shorter period of time and more economically. Still another object is to provide such a method which will provide articles of more perfectly smooth surfaces. A still further object is to provide new articles of manufacture comprising a body portion of a vulcanized elastomer composition having a uniform coating of a different vulcanized elastomer composition. Other objects are to advance the art. Still other objects will appear hereinafter.

The above and other objects may be accomplished in accordance with my invention which comprises coating the molding surface of a mold with a vulcanizable veneering elastomer composition dissolved or dispersed in an inert volatile liquid, drying the coating, placing in the coated mold a mass of a different vulcanizable elastomer composition, applying pressure to force such mass to conform to the mold and then vulcanizing the composition in the mold by subjecting them to vulcanizing temperatures. Upon stripping the resulting composite product from the mold, it will be found that the coating of veneering elastomer is firmly bonded to the surface of the base stock and will be of substantially the same thickness as the coating originally placed on the surfaces of the mold. This could not have been predicted since the molding of the base stock caused it to flow and, due to the friction of the surfaces of the base stock in contact with the surface of the film of veneer, a severe drag is placed on the film of veneer. However, the film of the veneer adheres to the surface of the mold with sufficient tenacity so that such drag does not substantially affect the thickness of the film.

The term "elastomer" as employed herein and in the claims means an elastic rubber-like substance including natural rubber as well as synthetic rubber-like products. The term "elastoprene" as employed herein and in the claims is used to designate natural rubber and synthetic rubber-like products derived from butadienes, isoprenes and the like. The term "elastothiomers" is employed herein and in the claims to designate the polyalkylene sulfides such as are obtained by the reaction of alkali metal polysulfides with organic compounds containing 2 or more replaceable chlorine atoms on different carbon atoms. The term "elastoplastics" is employed herein to designate the elastic rubber-like plastic materials. The term "elastomer" is generic to and includes the elastoprenes, elastothiomers and elastoplastics. The above terms are those suggested by H. L. Fisher in his article "Nomenclature of synthetic rubbers," appearing in pages 900 to 907 of "Rubber Chemistry and Technology," vol. 12 (1939), and are employed herein with the same meaning as given to them by H. L. Fisher in such article.

My invention will be more readily understood from the detailed description, hereinafter given, when taken with the accompanying drawing in which 2 represents the lower portion of a mold having depressions 4 therein outlining a suitable design. The upper portion 6 of the mold is provided with a shaft 8 through which pressure may be applied to force a mass to flow and conform to the contours of the mold. The two portions of the mold may be fastened together by bolts 10 and nuts 12.

In carrying out my invention, a solution or dispersion of the veneering elastomer in a volatile liquid is applied to the inner surfaces of the mold and then dried to form a uniform coating of the veneering elastomer 14 on the surfaces of the mold. Then a mass of a different vulcanizable elastomer 16 is placed in the mold and the two parts of the mold forced toward each other so as to cause the mass to conform to the mold. The parts of the mold are then fastened together by the bolts and nuts to maintain the parts in the desired position during the subsequent vulcanizing operation.

Any vulcanizable elastomer composition, which can be dissolved or dispersed in a volatile liquid medium, may be used as a veneering material for veneering a base stock which will be a different vulcanizable elastomer composition in which the elastomer may be the same or different from the elastomer in the veneering composition. Usually, the base stock will comprise a relatively cheap elastomer composition, such as natural rubber, which does not have the physical properties desired for the surface of the article and the veneering elastomer composition will generally be a more expensive elastomer composition which will have the properties desired for the surface of the article. However, this is not essential as the base stock may be composed of an elastomer having certain desirable characteristics, such as resistance to freezing, and the veneering elastomer composition may have other desirable characteristics, such as resistance to the action of solvents. A preferred composite article will comprise a rubber composition base stock with a coating of a chloroprene polymer. Another preferred article is one in which the base stock is a freeze resistant chloroprene polymer composition coated with a solvent resistant elastomer composition, such as "Thiokol FA" which is believed to be a polyalkylene polysulfide obtained by the reaction of an alkali metal polysulfide on an alkylene dichloride.

The liquid, in which the veneering composition is dissolved or dispersed, should be one which is chemically inert, that is, which does not react with the ingredients of the elastomer composition and one which is sufficiently volatile so that it can be readily removed from the coating on the mold by evaporation at the usual vulcanizing temperatures of the veneering elastomer composition. Such solvents include volatile aromatic and aliphatic liquids and water, such as xylene, toluene, methyl ethyl ketone, methanol, ethanol, water, ethylene dichloride and the like. The particular liquid employed will depend upon the veneering elastomer composition and the one, which is known to be most suitable for the particular composition, will be the one usually employed. For example, ethylene dichloride will usually be employed as the liquid medium for veneering compositions in which the elastomers are the polyalkylene sulfides.

The solution or dispersion of the vulcanizable veneering elastomer composition may be applied to the mold by spraying, painting, dipping or any other feasible means for uniformly coating the mold with such material. The liquid carrying medium will also be chosen with regard to the method to be employed for applying the material to the mold. Usually, when the spraying method is to be employed, the boiling point of the liquid should be around 290° F. or above, since liquids of materially lower boiling point will tend to cause "whipping" of the sprayed solutions and hence will usually be unsatisfactory for spraying. I have found xylene to be a particularly satisfactory liquid medium, especially for chloroprene polymer compositions, as it has a boiling point of 291° F., which is sufficiently high to make it suitable for spraying and yet which is sufficiently low to permit evaporation from a hot mold. Compositions, in which xylene is employed as the carrying liquid, will dry out in approximately 30 seconds at a mold temperature of about 260° F. to about 280° F. when such a composition is placed on the mold in sufficient amount to give a coating of from 0.005 inch to 0.010 inch in thickness. At mold temperatures of 280° F. to about 310° F., such compositions will dry out in from about 5 to about 10 seconds.

Compositions, in which xylene is employed as a carrying liquid, may also be employed for painting, dipping and other methods of applying the coating to the mold. Other liquids, having lower boiling points and higher evaporation rates, may also be employed when the solution or dispersion is to be painted on the mold or applied thereto in some similar manner and such compositions will naturally dry out at a more rapid rate.

The thickness of the veneer will be predetermined by the operator at the time of coating the mold with the veneering composition. It will usually be desirable to have the mold hot at the time of applying the veneering composition as a more uniform coating will thereby be obtained and the coating will dry out more rapidly. By "hot," I mean that the mold should be heated to a temperature approaching the normal vulcanizing temperature of the vulcanizable veneering composition. A quick covering of the mold by spraying or painting will usually form a coating of the veneering composition with a thickness of from about 0.001 inch to about 0.005 inch. By repeating the coating operation, films of veneering composition may be built up to any desired thickness. Usually, coatings having a thickness up to about 0.020 inch can be obtained before the mold temperature becomes too low to cause the efficient evaporation of liquid. Thicker coatings may be obtained by heating the mold to maintain its temperature during the application of the coatings. However, it would generally be undesirable to form a veneer having a thickness above 0.050 inch. For most purposes, a veneer having a thickness of from 0.001 inch to 0.020 inch will be quite satisfactory. Generally, I prefer to provide a veneer having a thickness of from 0.001 inch to 0.005 inch. For example, a veneer of a chloroprene polymer, having a thickness of about 0.005 inch on an automobile tire sidewall, has proved to be very satisfactory in protecting the tire from the action of ozone and from abrasion and cracking.

In some commercial adaptations of my process, it may be found desirable to lubricate the mold with any of the commonly employed mold lubricants prior to applying the solution or dispersion of the veneering composition. However, my experience has indicated that such lubrication is usually not necessary. If lubrication is used in any case, the amount should be very carefully controlled in order to avoid wiping off of the veneering composition during molding.

In order to more clearly illustrate my invention, the preferred modes of carrying the same into effect and the advantageous results to be obtained thereby, the following examples are given:

EXAMPLE I

A chloroprene polymer was compounded to improve its attrition and aging properties and put into solution by means of xylene. The following formula was used in preliminary experiments and has been found to be satisfactory:

| | |
|---|---|
| A semi-fluid polymer of chloroprene, prepared substantially according to Example 51 of U. S. Patent 2,234,215 | 100.00 |
| Piperidinium pentamethylene dithio-carbamate | 1.0 |
| Barium sulfate | 45.0 |
| Titanium dioxide | 8.0 |
| Zinc oxide | 5.0 |
| Xylene | 300.0 |

A mold was heated to the proper vulcanizing temperature of 307° F. and its face coated with the aforesaid solution. As soon as the film appeared to be dry, an unshaped mass of rubber of the following composition was placed in the mold and pressure applied to extend it into all portions of the previously coated mold:

| | |
|---|---|
| Smoked sheets | 100.0 |
| Zinc oxide | 5.0 |
| Carbon black | 25.0 |
| Stearic acid | 2.0 |
| Butyraldehyde-aniline condensation product | 1.0 |
| Sulfur | 3.0 |

The chloroprene film adhered tenaciously to the mold during this shaping process; however, as vulcanization proceeded, a firm bond between the chloroprene polymer and the rubber base stock was produced. At the end of fifteen minutes, the composite article was stripped from the mold, the chloroprene polymer being firmly bonded to the base stock and having substantially no adhesion to the mold face.

When this solution of veneering composition was sprayed on to the mold, so as to give a coating of veneering composition having a thickness of 0.005 inch, the film dried out in 10 seconds. On the other hand, when such solution was painted on to the base stock at 82° F. to give a veneering composition of 0.005 inch thickness, 24 hours were required for the film to dry out.

EXAMPLE II

Example I was repeated using an aqueous dispersion of chloroprene polymers, prepared according to U. S. Patent 2,264,173 and compounded in the following manner, as a source of the veneering elastomer:

| | |
|---|---|
| Polymer latex | 600.00 |
| Lithopone | 30.0 |
| Zinc oxide | 15.0 |
| Phenyl-alpha-naphthylamine | 6.0 |
| Sulfur | 5.0 |
| Sodium dibutyl dithiocarbamate | 5.0 |
| Long chain alcohol sulfate salts [1] | 1.5 |
| Casein | 0.75 |

[1] These are the sodium salts of sulfate mono-esters of a mixture of higher fatty alcohols, comprising chiefly the lauryl and myristyl derivatives.

The base stock used was identical with that used in Example I. A satisfactory composite article was produced.

EXAMPLE III

Example I was repeated, using a co-polymer compound of butadiene and acrylic nitrile of the following composition as a source of the veneering elastomer:

| | |
|---|---|
| Butadiene (co-polymerized) | 60.0 |
| Acrylic nitrile (co-polymerized) | 40.0 |
| Blanc Fixe | 40.0 |
| Zinc oxide | 5.0 |
| Stearic acid | 1.0 |
| Benzothiazyl disulfide | 1.5 |
| Sulfur | 1.5 |
| Methyl ethyl ketone | 640.0 |
| Dibutyl phthalate | 15.0 |

The base stock used was identical with that used in Example I. A satisfactory composite article was produced.

EXAMPLE IV

Example II was repeated using a water-dispersion of a co-polymer of butadiene and acrylic nitrile in place of the latex of that example as a source of the veneering elastomer. This water-dispersion was compounded in the following manner:

| | |
|---|---|
| Butadiene (co-polymerized) | 60.0 |
| Acrylic nitrile (co-polymerized) | 40.0 |
| Zinc oxide | 2.0 |
| Sulfur | 1.5 |
| Phenyl-alpha-naphthylamine | 1.0 |
| Sodium dibutyl dithiocarbamate | 0.5 |
| Water | 300.0 |

The results obtained were comparable with those of Example II.

EXAMPLE V

Example IV was repeated using natural latex as a source of the veneering elastomer. It was compounded in the following manner:

| | |
|---|---|
| Rubber latex | 100.0 |
| Zinc oxide | 2.0 |
| Sulfur | 1.5 |
| Phenyl-alpha-naphthylamine | 1.0 |
| Sodium dibutyl dithiocarbamate | 0.5 |

A satisfactory composite article was obtained.

EXAMPLE VI

An experiment was carried out using a plasticized polymer compound of the following composition as a source of the veneering elastomer:

| | |
|---|---|
| Polyvinyl acetate | 50.0 |
| Methyl alcohol | 50.0 |
| Dibutyl phthalate | 10.0 |

A satisfactory composite article was obtained.

EXAMPLE VII

This experiment describes the application of my process to the veneering of a sponge rubber. In this experiment, the mold surface was lubricated with a higher alcohol, prior to applying the veneering coat, in order to assist in the removal of the composite article from the mold at the conclusion of the vulcanizing step. The application of the veneer to the mold and the veneering compound used was identical with that of Example I. The base stock was a typical sponge rubber compound of the following composition:

| | |
|---|---:|
| Pale crepe | 100.0 |
| Zinc oxide | 5.0 |
| Channel black | 2.0 |
| Whiting | 30.00 |
| Stearic acid | 5.0 |
| Petrolatum | 5.0 |
| Penyl-alpha-naphthylamine | 1.5 |
| Tetramethyl-thiuram-monosulfide | 0.1875 |
| Sulfur | 3.5 |
| Diazo-amino-benzene | 2.0 |

A satisfactory composite article was obtained.

EXAMPLE VIII

For some time the aircraft industry has been demanding a synthetic elastomer with two major qualifications: (1) oil resistance and (2) freeze resistance. Unfortunately, these two properties are inversely correlated as far as present known synthetic elastomers are concerned. By this experiment, I have been able to produce a product which will fulfill these requirements. Three stocks were made up as follows:

Base stock

| | |
|---|---:|
| Elastomer A [1] | 100.0 |
| Extra light calcined magnesia | 5.0 |
| Petrolatum | 2.0 |
| Channel black | 30.0 |
| Clay | 60.0 |
| Dibutyl phthalate | 10.0 |
| Sulfur | 1.0 |
| Zinc oxide | 5.0 |
| Phenyl-alpha-naphthylamine | 2.0 |

Veneer I

| | |
|---|---:|
| Elastomer B [2] | 90.0 |
| Elastomer C [3] | 10.0 |
| Extra light calcined magnesia | 15.0 |
| Sulfur | 0.5 |
| Zinc oxide | 5.0 |
| Phenyl-alpha-naphthylamine | 2.0 |
| Toluene | 400.0 |

Veneer II

| | |
|---|---:|
| "Thiokol FA" [4] | 100.0 |
| Zinc oxide | 10.0 |
| Soft carbon black | 80.0 |
| Stearic acid | 0.5 |
| Benzothiazyl disulfide | 0.3 |
| Diphenyl guanidine | 0.1 |
| Ethylene dichloride | 300.0 |

[1] This is a freeze resistant elastic polymer of chloroprene.
[2] This is a solvent resistant elastic polymer of chloroprene.
[3] This is an abrasion resistant elastic polymer of chloroprene.
[4] This is an oil resisting elastomer appearing on the market under the trade name "Thiokol FA" and to the best of my knowledge is a polyalkylene polysulfide, obtained by the reaction of an alkali metal polysulfide on an alkylene dichloride, but its exact chemical constitution is unknown to me.

A portion of the base stock was molded and cured for 15 minutes at 90 pounds steam pressure. In separate experiments, each of the veneering compositions were painted on to hot molds in an amount sufficient to give a veneer 0.001 inch thick, the veneering coatings dried out, portions of the base stock placed in the molds and extended into the coated cavity and the whole vulcanized. The resulting products were immersed in a high octane aircraft gasoline for varying periods of time. In the following table is given the linear swell of these products after being immersed in such gasoline for one day and for 4 days, respectively.

| Veneer | Increase 1 day | Increase 4 days |
|---|---|---|
| | Per cent | Per cent |
| Nil | +2.4 | +8.2 |
| I | +0.5 | +4.8 |
| II | [1]−0.6 | [1]−0.6 |

[1] Contraction of sample due to evaporation of gasoline from surface.

Due to the characteristics of the base stock, these products were freeze resistant. The application of Veneer II to such base stock gave the property of oil resistance to such product. The amount of the veneer was insufficient to materially affect the freeze resistance of the product.

Valuable products are also obtained, employing a rubber composition as the base stock and Veneer II as the veneering composition.

It will be understood that the above examples and the specific embodiments hereinbefore given are given for illustrative purposes only and hence that my invention is not to be restricted to such specific embodiments, but I intend to cover my invention broadly as in the appended claims. It will be readily apparent to those skilled in the art that many variations and modifications can be made without departing from the spirit or scope of my invention. The temperatures, volatile liquids and ingredients in the compositions may be widely varied. Also, other elastomers may be substituted for those specifically mentioned above, both in the veneering compositions and in the base stocks.

I particularly intend to include within the scope of my invention elastomers within the following groups:

1. Elastoprenes

Chloroprene polymers, other than those specifically mentioned, may be employed. Natural rubber may be employed as a veneering material on synthetic elastomers. Also, copolymers of butadienes and acrylic derivatives are quite suitable. I also intend to include other derivatives of the butadiene class, such as synthetic butadiene polymers, natural and synthetic isoprene rubbers, mono- and di-methyl butadiene polymers, haloprene derivatives, halogenated natural rubbers and natural rubber isomers.

2. Elastothiomers

This class comprises primarily the polyalkylene sulfides, such as are obtained by the reaction of alkali metal polysulfides on organic compounds containing 2 or more replaceable chlorine atoms on different carbon atoms.

3. Elastoplastics

This class comprises the polyvinyl acetates; polymers, co-polymers and inter-polymers of acrylic esters; inter-polymers and co-polymers of butadienes with various polymers of acrylic and styrene nature; mixed glyptals; plasticized polyvinyl halides; polyvinyl esters; polystyrene; and co-polymers and inter-polymers of styrene with other elastoplastics. These elastoplastics are quite satisfactory. A 50% solution by weight of polyvinyl acetate in methanol, plasticized with 20 parts of dibutyl phthalate gave a satisfactory veneer when sprayed into a mold.

The process and products of my invention have many advantages over veneered products obtained by the laminating process and over such process. By my process, veneered products, having a veneer of only from 0.001 inch to 0.020 inch in thickness, can be made, whereas, in the laminating process the veneers must be above 0.030 inch in thickness. Thus, my invention makes it possible to produce veneered products in a practical and economical range. By my process, the products have a veneer of constant gauge over the entire surface, whereas, such products cannot be obtained by the laminating process due to the thinning out of the veneer during molding. Furthermore, my process requires considerably less time and labor than the laminating process and is much more economical. By my process, a smooth surface is first produced on the mold and, as a result, the base stock flows smoothly during the molding operation so that the final product is free of roughnesses, cracks and other surface imperfections. My process is applicable to the preparation of products of intricate design which could not be made by methods previously employed.

My process and the products thereof have similar advantages over the previously proposed process of coating the base stock with a solution or dispersion of the veneering material. For example, the products of my invention have a veneer of more uniform gauge, the time for drying the veneer is enormously shortened, the problem of handling sticky stocks is eliminated and articles of more intricate design can be obtained.

From the above, it will be apparent that by my invention, I have made it possible for manufacturers to produce articles of greatly improved physical properties at a comparatively small expense. Furthermore, by my invention, it is possible to produce such articles with less labor and difficulty and in a greatly shortened period of time. It will thus be apparent that, by my invention, I have made a very valuable contribution to the art.

I claim:

1. The process of veneering elastomers which comprises applying to the surface of a hot mold a coating of a vulcanizable veneering elastomer composition in an inert volatile liquid, drying the coating, placing in the coated mold a mass of a different vulcanizable elastomer composition, applying pressure to force such mass to conform to the mold and then vulcanizing the compositions in the mold.

2. The process of veneering elastomers which comprises applying to the surface of a hot mold a coating of a vulcanizable synthetic veneering elastomer composition in an inert volatile liquid, drying the coating, placing in the coated mold a mass of a different vulcanizable elastomer composition, applying pressure to force such mass to conform to the mold and then vulcanizing the compositions in the mold.

3. The process of veneering elastomers which comprises applying to the surface of a hot mold a coating of a vulcanizable veneering elastomer composition in an inert volatile liquid, the veneering elastomer being a chloroprene polymer, drying the coating, placing in the coated mold a mass of a different vulcanizable elastomer composition, applying pressure to force such mass to conform to the mold and then vulcanizing the compositions in the mold.

4. The process of veneering elastomers which comprises applying to the surface of a hot mold a coating of a vulcanizable veneering elastomer composition in an inert volatile liquid, the veneering elastomer being a chloroprene polymer, drying the coating, placing in the coated mold a mass of a vulcanizable rubber composition, applying pressure to force such mass to conform to the mold and then vulcanizing the compositions in the mold.

5. The process of veneering elastomers which comprises applying to the surface of a hot mold a coating of a vulcanizable veneering elastomer composition in an inert volatile liquid, the veneering elastomer being a co-polymer of butadiene and acrylic nitrile, drying the coating, placing in the coated mold a mass of a different vulcanizable elastomer composition, applying pressure to force such mass to conform to the mold and then vulcanizing the compositions in the mold.

6. The process of veneering elastomers which comprises applying to the surface of a hot mold a coating of a vulcanizable veneering elastomer composition in an inert volatile liquid, the veneering elastomer being a polyalkylene polysulfide, drying the coating, placing in the coated mold a mass of a different vulcanizable elastomer composition, applying pressure to force such mass to conform to the mold and then vulcanizing the compositions in the mold.

7. The process of veneering elastomers which comprises applying to the surface of a hot mold a coating of a vulcanizable veneering elastomer composition in an inert volatile liquid, drying the coating, placing in the coated mold a mass of a different vulcanizable elastomer composition, the elastomer of such mass being a synthetic elastomer, applying pressure to force such mass to conform to the mold and then vulcanizing the compositions in the mold.

8. The process of veneering elastomers which comprises applying to the surface of a hot mold a coating of a vulcanizable veneering elastomer composition in an inert volatile liquid, the veneering elastomer being a polyalkylene polysulfide, drying the coating, placing in the coated mold a mass of a different vulcanizable elastomer composition, the elastomer of such mass being a synthetic elastomer, applying pressure to force such mass to conform to the mold and then vulcanizing the compositions in the mold.

9. The process of veneering elastomers which comprises applying to the surface of a hot mold a coating of a vulcanizable veneering elastomer composition in an inert volatile liquid, the veneering elastomer being a polyalkylene polysulfide, drying the coating, placing in the coated mold a mass of a different vulcanizable elastomer composition, the elastomer of such mass being a chloroprene polymer, applying pressure to force such mass to conform to the mold and then vulcanizing the compositions in the mold.

10. A method of making a mold-vulcanized cellular article of rubbery material having an impervious protective skin coating of rubbery material; which method comprises preheating a mold to a temperature high enough to flash evaporate water; applying to the preheated mold an aqueous dispersion of a vulcanizable rubbery composition adapted, after drying and vulcanization, to produce an impervious protective skin coating of rubbery material, and flash-drying the dispersion on the mold; placing in the mold in contact with the dried coating layer, while it is still hot and before the coating has lost its tackiness from cooling and contact with the air, an unblown rubbery composition adapted, after heating, to produce a cellular body portion; and subjecting the assembly to molding temperature and pressure to blow the unblown rubbery composition and to vulcanize the coating layer and the blown cellular body portion in mutual contact so as to form an integral article; said operations being performed without permitting the mold to become cool.

11. A method of making a mold-vulcanized cellular article of rubbery material having an impervious protective skin coating of a rubbery material of substantially different composition than the cellular portion thereof; which method comprises preheating a mold to a temperature high enough to flash evaporate water; applying to the preheated mold an aqueous dispersion of a vulcanizable rubbery composition adapted, after drying and vulcanization, to produce an impervious protective skin coating of a light-resistant rubbery material, and flash drying the dispersion on the mold; placing in the mold in contact with the dried coating layer, while it is still hot and before the coating has lost its tackiness from cooling and contact with the air, an unblown rubbery composition adapted, after heating, to produce a cellular body portion of less light-resistant but more resilient rubbery material; and subjecting the assembly to molding temperature and pressure to blow the unblown rubbery composition and to vulcanize the coating layer and the blown cellular body portion in mutual contact so as to form an integral article; said operations being performed without permitting the mold to become cool.

12. A method of making a mold-vulcanized cellular article of rubbery material having a cellular body and an impervious protective skin coating thereon; which method comprises preheating a mold to a temperature high enough to flash-evaporate water; applying to the preheated mold an aqueous dispersion of a neoprene composition adapted, after drying and vulcanization, to produce an impervious protective skin coating of rubbery neoprene material, and flash-drying the dispersion on the mold; placing in the mold in contact with the dried coating layer, while it is still hot and before the coating has lost its tackiness from cooling and contact with the air, an unblown natural rubber composition adapted, after heating, to produce a cellular body portion; and subjecting the assembly to molding temperature and pressure to blow the unblown rubbery composition and to vulcanize the coating layer and the blown cellular body portion in mutual contact so as to form an integral article; said operations being performed without permitting the mold to become cool.

ELDEN EARL LEACH, Jr.

REFERENCES CITED

The following references are of record in the file of this patent:

UNITED STATES PATENTS

| Number | Name | Date |
| --- | --- | --- |
| 1,435,526 | Johnston | Nov. 14, 1922 |
| 1,484,731 | Malm | Feb. 26, 1924 |
| 1,898,731 | Kohler | Feb. 21, 1933 |
| 1,942,840 | Sheppard et al. | Jan. 9, 1934 |
| 1,943,439 | Hopkinson | Jan. 16, 1934 |
| 1,950,436 | Williams | Mar. 13, 1934 |
| 2,049,974 | Patrick | Aug. 4, 1936 |
| 2,103,905 | Schelhammer | Sept. 20, 1938 |
| 2,201,271 | Partridge | May 21, 1940 |
| 2,227,991 | Winkelmann et al. | Jan. 7, 1941 |
| 2,308,724 | Stamberger | Jan. 19, 1943 |
| 2,313,985 | Bradshaw | Mar. 16, 1943 |
| 2,339,547 | Carter | Jan. 18, 1944 |

FOREIGN PATENTS

| Number | Country | Date |
| --- | --- | --- |
| 486,641 | Great Britain | June 8, 1938 |

Certificate of Correction

Patent No. 2,437,855.  March 16, 1948.

ELDEN EARL LEACH, JR.

It is hereby certified that errors appear in the printed specification of the above numbered patent requiring correction as follows: Column 7, line 20, Example VII, for "Penyl-alpha-naphthylamine" read *Phenyl-alpha-naphthylamine*; column 12, line 28, list of references cited, name of patentee, for "Johnston" read *Johnston et al.*; line 35, for the patent number "2,103,905" read *2,130,905*; and that the said Letters Patent should be read with these corrections therein that the same may conform to the record of the case in the Patent Office.

Signed and sealed this 18th day of May, A. D. 1948.

[SEAL]

THOMAS F. MURPHY,
*Assistant Commissioner of Patents.*